Figure 1:
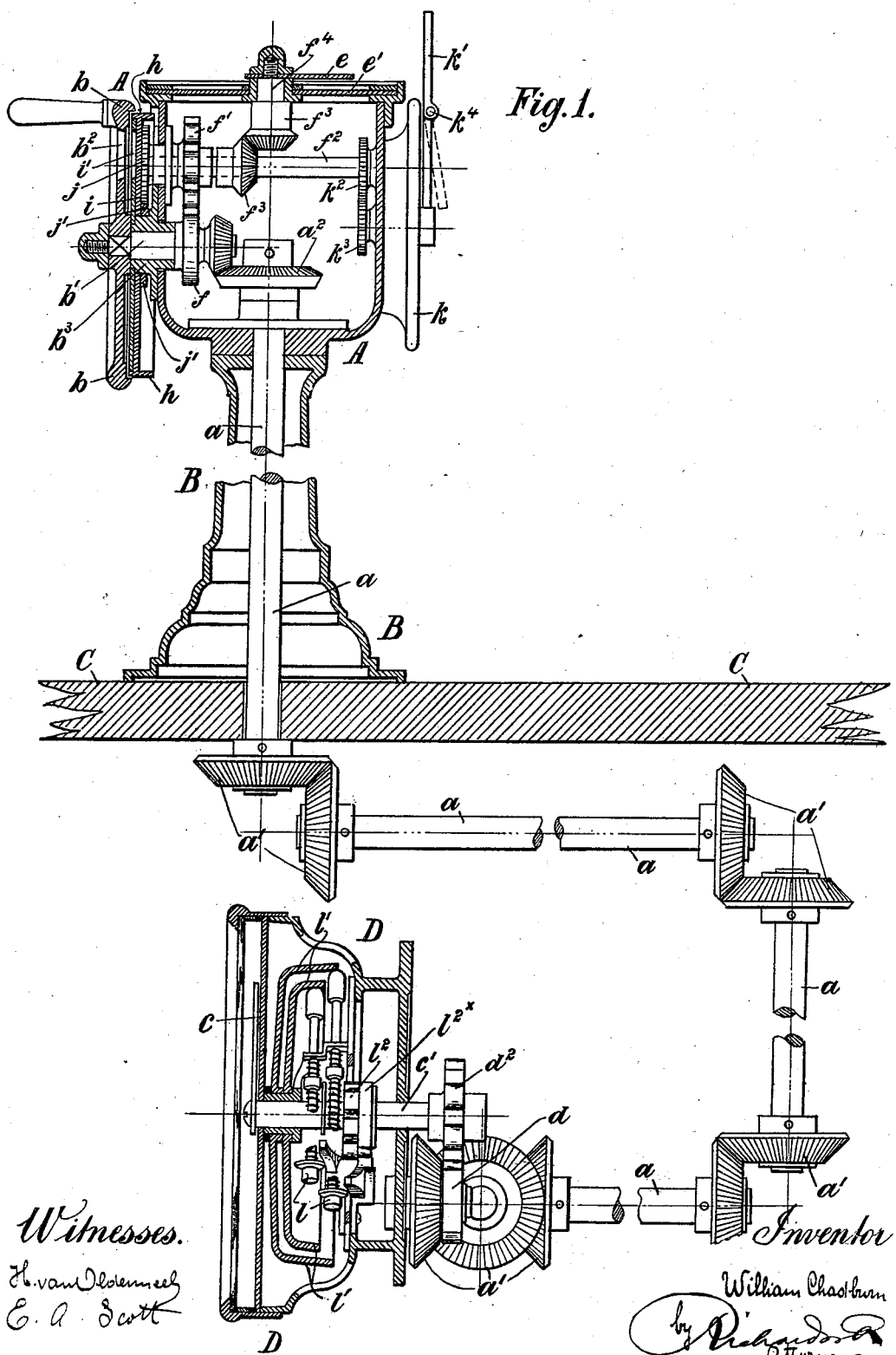
Figure 8:
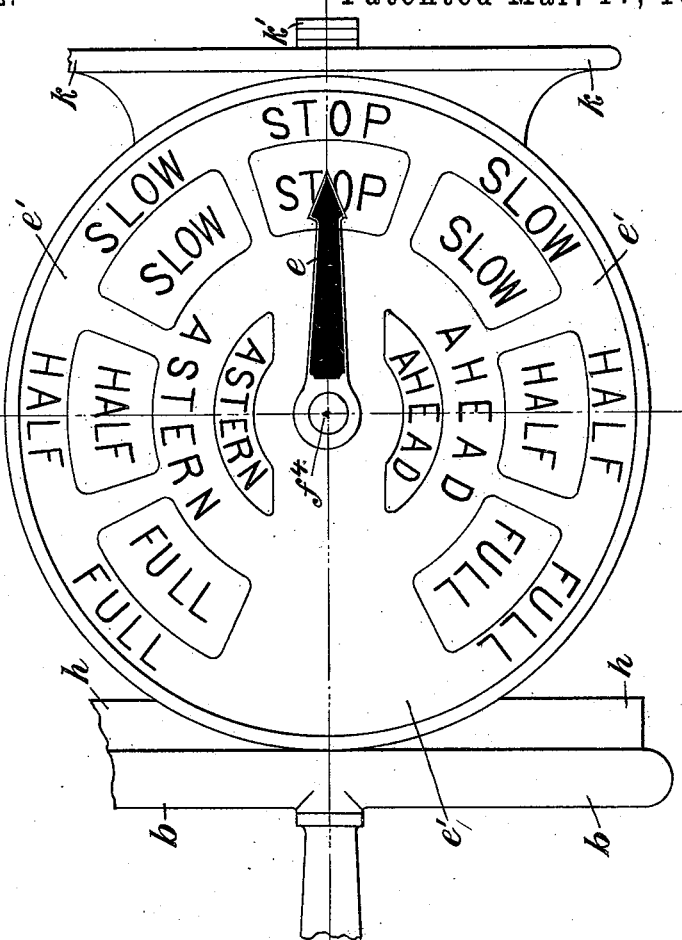

(No Model.) 6 Sheets—Sheet 1.

W. CHADBURN.
ORDER TRANSMITTING DEVICE FOR VESSELS.

No. 556,332. Patented Mar. 17, 1896.

Witnesses.
H. van Oldenneel
E. A. Scott

Inventor
William Chadburn
by Richardson
Attorneys

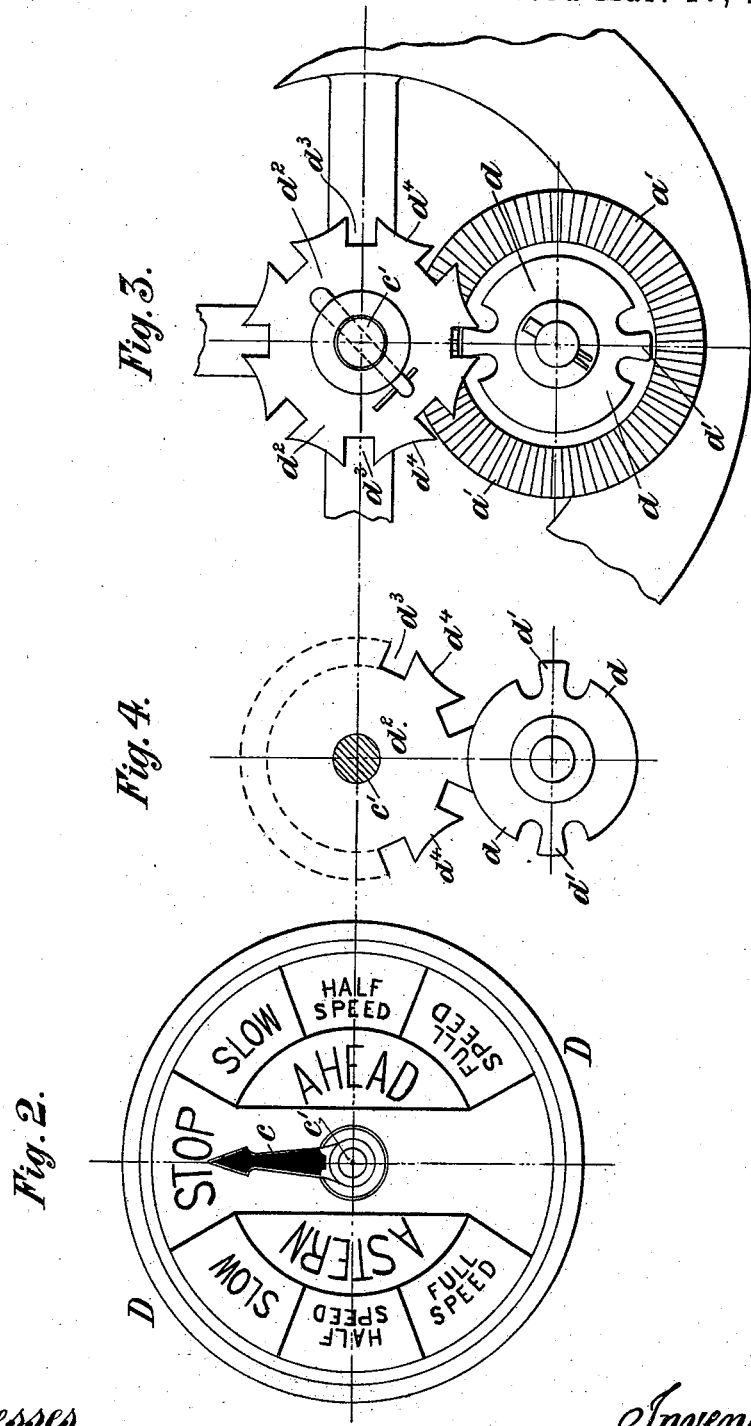

(No Model.) 6 Sheets—Sheet 3.
W. CHADBURN.
ORDER TRANSMITTING DEVICE FOR VESSELS.
No. 556,332. Patented Mar. 17, 1896.
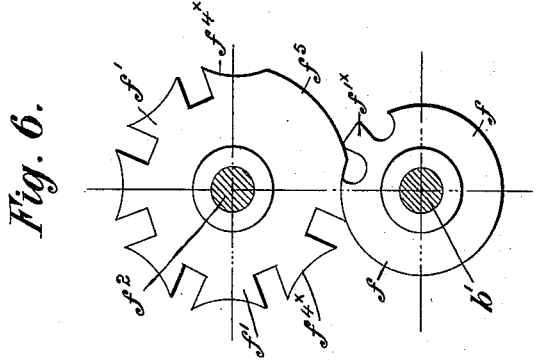
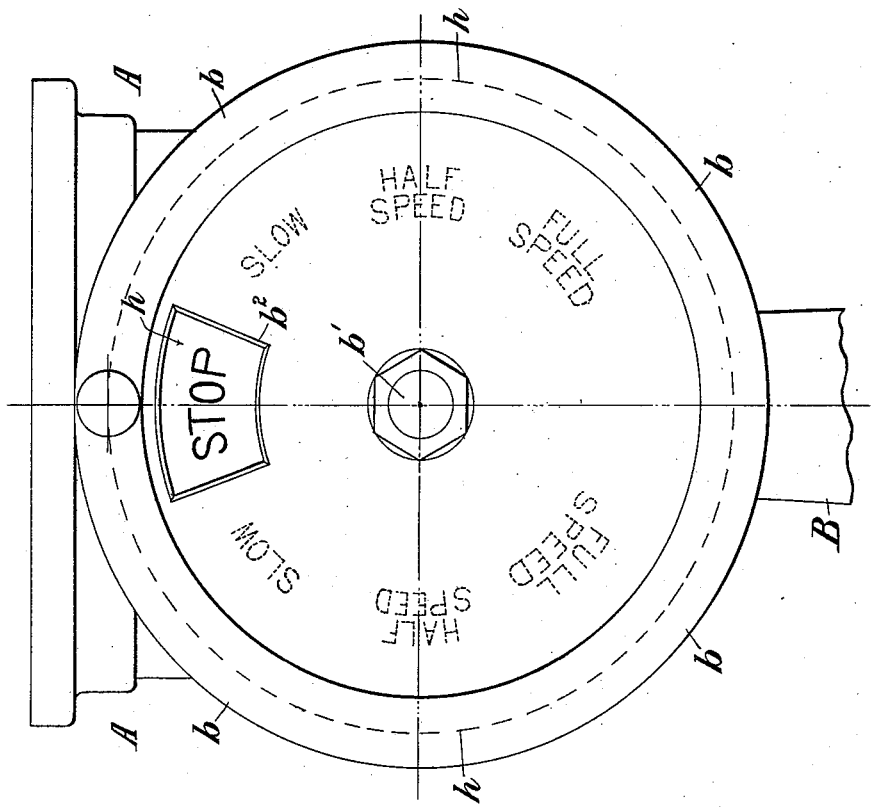

(No Model.) 6 Sheets—Sheet 4.

W. CHADBURN.
ORDER TRANSMITTING DEVICE FOR VESSELS.

No. 556,332. Patented Mar. 17, 1896.

Witnesses.
H. van Oldenneel
E. A. Scott

Inventor.
William Chadburn
by Richardson
Attorneys (No Model.) 6 Sheets—Sheet 5.
W. CHADBURN.
ORDER TRANSMITTING DEVICE FOR VESSELS.

No. 556,332. Patented Mar. 17, 1896.

Witnesses.
H. van Oldenneel
E. A. Scott

Inventor.
William Chadburn
Richardson
Attorneys (No Model.) 6 Sheets—Sheet 6.
W. CHADBURN.
ORDER TRANSMITTING DEVICE FOR VESSELS.

No. 556,332. Patented Mar. 17, 1896.

Witnesses.
H. van Oldenneel
E. A. Scott

Inventor.
William Chadburn
by Richards
Attorneys

UNITED STATES PATENT OFFICE.

WILLIAM CHADBURN, OF LIVERPOOL, ENGLAND.

ORDER-TRANSMITTING DEVICE FOR VESSELS.

SPECIFICATION forming part of Letters Patent No. 556,332, dated March 17, 1896.

Application filed July 8, 1895. Serial No. 555,288. (No model.)

*To all whom it may concern:*

Be it known that I, WILLIAM CHADBURN, a subject of the Queen of Great Britain and Ireland, residing at Liverpool, in the county of Lancaster, England, have invented new and useful improvements in apparatus for transmitting orders, notifications, and the like from one part or station of a navigable vessel to another and for analogous purposes, of which the following is a specification.

This invention has reference more particularly to apparatus used on board ship for communicating between one part of the ship and another and for transmitting conditions of machinery and notifications from the part where such machinery is located to another part or other parts where it is desired to show or indicate the same; and the type of apparatus to which this invention is particularly applicable is that in which the transmission of orders and the conditions, &c., is effected by means of shafts or rods and toothed gearing which are rotated, and also to apparatus wherein the transmission of motion is effected by chains or cords.

According to this invention, the pointers or telegraphic apparatus of the kind referred to are operated through a device or mechanism through which they will be moved relatively a less amount than the shaft or chain driven part by which they are actuated, and, further, by which they are moved sharply from one order to another, and not during the whole period of movement of the transmitting instrument or means, and are, moreover, positively moved into the center of each order or the exact position required and positively prevented from moving therefrom—*i. e.*, held during their periods of rest.

The mechanism or means which I use is in one case so arranged and adapted to work that while one part may be making a number of revolutions in continuous movement another part will be driven thereby intermittently—viz., whenever the engagement between the two is effected—with a period of rest. The movement of the pointer will be the same—that is, it will be moved sharply and positively into the center or correct position over or in connection with the dial, and will be positively prevented from being moved from this position until the apparatus is actuated to give another order, notification, or the like. By this means mistakes due to errors or defects of mechanism are rendered impossible and the desired and correct action of the apparatus assured.

To enable the invention to be clearly and fully understood, drawings illustrative of it are hereto annexed, and the invention will now be described with the aid of these drawings.

The machinery given is an example of apparatus illustrating the invention as applied to ordinary ships' telegraphic purposes for communicating between the bridge or other part of the ship and the engine-room.

Figure 7:
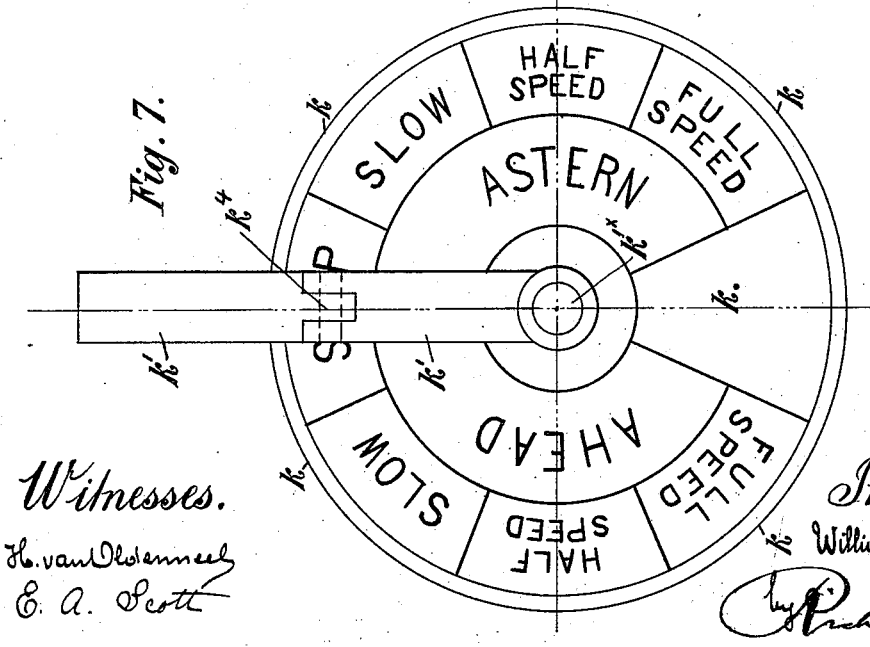
Figure 9:
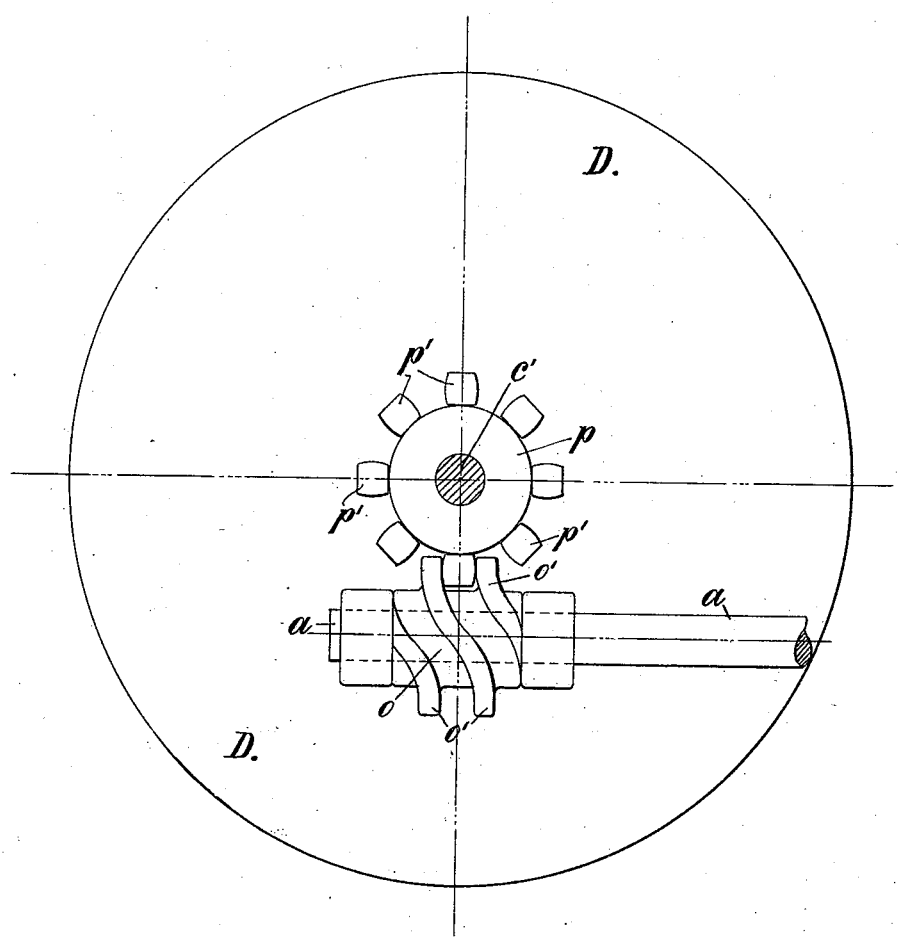
Figure 10:
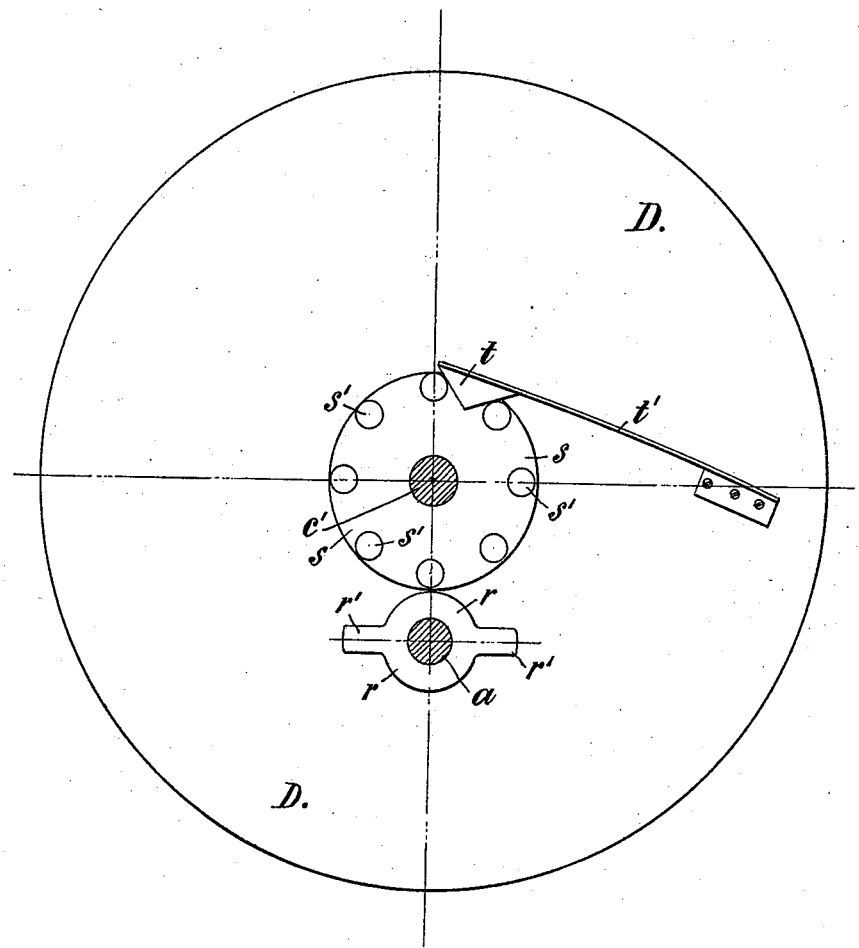

Figure 1 shows the apparatus in sectional elevation, the transmitting-instrument being shown at the top of the figure and the receiving instrument at the bottom, the two being connected together by shafting and beveled wheels. Fig. 2 shows a front view of the receiving-instrument, illustrating the dial and pointer; and Figs. 3 and 4 show the means of actuating the pointer of the receiving-instrument, and by which the mode of action and the effects herein described are produced, the position of the mechanism in Fig. 3 being that when the pointer is being moved, while that in Fig. 4 shows the position when the pointer is stationary and held. Figs. 5 to 8 illustrate in detail the transmitting apparatus, Fig. 5 being an elevation showing one side of it, Fig. 6, an elevation showing the actuating mechanism employed in this apparatus for the transmitter-pointers and the stop mechanism; Fig. 7, an elevation showing the opposite side of the actuating mechanism, and Fig. 8 a plan of the same. Fig. 9 is a face view of a modified mechanism for transmitting movement to the pointer-shaft. Fig. 10 is a further modification.

Referring in the first instance to Fig. 1, A denotes generally the head of the transmitting-instrument, and B is the stand on which it is carried. C designates the bridge or deck of the ship, and D is the receiving-instrument.

The shafting, by which communications are transmitted from one instrument to the other, is designated $a$, and at the parts or points thereof where the direction of the shafting is changed (generally at right angles) there are bevel-wheels $a'$. $b$ is a hand-operated wheel by which the shafting $a$ is revolved and the whole telegraphic apparatus is actuated, and $c$ is the pointer of the receiving-instrument, which is moved by the operation of the wheel $b$, motion from the shafting $a$ being transmitted to the pointer by the mechanism illustrated in detail in Figs. 3 and 4. This consists of a disk $d$, having in the case shown two teeth $d'$, and a disk $d^2$ with notches $d^3$, into which the teeth $d'$ enter, and intervening portions $d^4$, which are engaged by the teeth $d'$. The outer edge of the parts $d^4$ is concave, being of a corresponding curvature to the curve of the periphery of the disk $d$, and one of these concave parts coincides and engages with the periphery of $d$ whenever the teeth $d'$ are not engaged with the parts $d^4$, as indicated in Fig. 4.

The disk $d$, as will be seen, is connected with and driven by the shafting and beveled wheels, while the disk $d^2$ is fixed upon the pointer-spindle $c'$ of the receiving-instrument D.

The apparatus is so adapted and constructed that the actuating-wheel $b$ shall be rotated one complete revolution for each action—i. e., to move the pointer $c$ of the receiver (and the other pointers) a distance equal to that of the center of one order from another—that is to say, one revolution of the wheel $b$ will cause the receiver and other pointers to be moved exactly from one order to another. As there are eight divisions and seven orders on the dial of the receiving-instrument shown, to move the pointer $c$ over the whole set of orders on the dial the handle or wheel $b$ is revolved six complete revolutions, and to give one-eighth the amount of movement of the wheel $b$ to the receiver-pointer $c$ to move it one order's distance the amount of movement transmitted to the disk $d^2$ by the disk $d$ must be one-eighth of that of the said disk $d^2$. However, as there is employed in the transmitter-head A bevel-gearing $a^2$ in which the wheel on the shaft $b'$ driven by the wheel $b$ is half the size of the bevel-wheel it drives upon the shafting $a$, the amount of movement of the shafting $a$ for each action of the wheel $b$ will be one-half of the amount thereof, so that the movement of the shafting $a$ will be four times as much as the actual movement of the pointer $c$ in moving from one order to the other. This excess of movement of the shafting $a$ insures that the wheel or disk $d^2$ and pointer $c$ will be moved by the disk $d$, for each revolution of the wheel $b$, the full distance from one order to another without fail. The position of rest of the wheel $b$ is with its handle uppermost, and the normal position of rest of the disk $d$ is that shown in Fig. 4, by which it is shown that $d$ may have movement about three-eighths of a revolution (i. e., three-fourths of one complete movement) without affecting $d^2$. Thus, as will be seen, in a telegraphic apparatus defective fitting, backlash, torsion, and the like in the shafting or bevel-wheels, and incorrect movement of the transmitter mechanism or its actuating-wheel, may take place without bringing the chance or probability of defective action between the disk $d$ and the pointer-disk $d^2$ within a possibility, as the degree of revolution of the disk $d$ to move the disk $d^2$ the distance from one of its parts $a^4$ to another into the position shown in Fig. 4 is only a fraction of the whole extent of the movement of the shafting $a$, thereby allowing for large defects on either side of its normal position of rest without affecting at all the correct action of the apparatus. The action, then, is that the pointer $c$ has to be moved from one order to another—that is, one-eighth of a circle—while the wheel $b$ is rotated one complete revolution, and by the movement transmitted to the shafting $a$ (which will be one-half of a complete revolution at the transmitter) the disk $d$ will be rotated some portion of a half-revolution, the amount of movement less than the full half-revolution being caused by backlash, torsion, defective fitting, &c., above referred to, and in this movement of the disk $d$ (which in any case will be much greater than the amount of movement required to be given to the disk $d^2$) the tooth $d'$ of the disk $d$ under all circumstances will engage with one of the teeth or parts $d^4$ of $d^2$ and give it that relatively small but positive amount of movement which is necessary to move it the distance of the pitch apart of these parts $b^4$, and the pointer $c$ from one order division to another, these parts being removed from each other the same number of degrees as are the divisions of the receiver-dial.

Each action of the disk $d^2$ by the disk $d$ will, obviously, be sharp or quick, and consequently the pointer $c$ will be sharply moved from one order to another; and since, after the tooth $d'$ leaves the notch $d^3$ of the disk $d^2$, the circular edge of the disk $d$ coincides with the edge of the parts $d^4$, the same amount of movement and position of the pointer $c$ must take place positively each time it is operated—that is, from the center of one order it will be moved positively to the exact center of the next, both in the backward and in the forward direction, no matter what position the teeth $d'$ of the disk $d$ take after each actuation of that disk, rendering, therefore, the position of the pointer $c$ not only certain, but also independent of the position of all the gear between the disk $d^2$ and wheel $b$. Further, when the pointer $c$ has been moved in this manner it is positively held in the position to which it has been moved by the edge of the disk $d$ being coincident with the edge of its parts $d^4$, so that at all or any time when one of the teeth $d'$ is not engaged with the disk $d^2$ that disk and the pointer $c$ are positively held in a position from which they cannot be moved, at the same time leaving the shafting $a$ and disk $d$ free to move.

In transmitting-instruments of the kind illustrated in Fig. 1—namely, instruments wherein the upper face or dial $e'$ of the instrument and pointer $e$ lie in the horizontal plane, and the pointer, as well as that in the receiver, is to be actuated, under this invention—this pointer is operated from the shaft $b'$ of the wheel $b$ by disks $f$ and $f'$ of the same nature, excepting as hereinafter noted, and operated in the same manner and extent as the disks $d$ and $d^2$ above described. Of these disks, $f$ is on the shaft $b'$ and $f'$ is on a secondary shaft $f^2$, which passes from one side of the instrument to the other, and the movement given to the disk $f'$ by the disk $f$ is transmitted to the pointer $e$ through the shaft $f^2$, which is driven by $f'$, bevel-wheels $f^3$, and a spindle $f^4$, carrying the pointer $e$. In this arrangement the disks $f$ and $f'$ are not only used to move the pointer $e$, but also serve as a stop mechanism, acting in the same manner as the well-known "Geneva" stop, by which the pointers $c$ and also $e$ cannot be moved farther than over the full range of the orders or indications upon the dials. To effect this, there being seven orders and six movements, the disk $f'$ has six recesses and seven parts $f^{4\times}$, the edges of which coincide with the periphery of the disk $f$, while the part $f^5$ between the adjacent or last portions $f^{4\times}$ is left full and serves as a stopping part, against which the tooth $f'^{\times}$ of $f$ comes at the completion of its action in either direction.

As a further improvement connected with the transmitting-instruments of ships' telegraphs, I provide at the two opposite sides thereof, as well as a horizontal dial and pointer, vertical indicating or pointing means, so that to those on the bridge indications as to the position or nature of the order existing in the apparatus can be seen from either side of the instrument at some distance from same.

On one side of the apparatus—namely, on the wheel side—I provide behind the wheel $b$ a rotating dial $h$, with orders inscribed upon it similar to those on the upper dial and the receiving-instrument, and in the wheel $b$, at the part which is uppermost when in the normal position or position of rest, a window $b^2$ is provided, through which the orders behind it can be seen on the dial $h$, while to shield and hide all the other orders on the dial $h$, so as to prevent them being seen when the wheel $b$ is being rotated, I provide a fixed disk $i$ on the fixed sleeve $b^3$, which supports the shaft $b'$, the said disk $i$ having a window $i'$ in it at the upper part, so that the window will be exactly behind that of the wheel $b$ when in this position.

To exhibit the different orders through the windows $i'$ and $b^2$, the dial $h$ must be rotated, and this is effected by a spur-wheel $j$ on the shaft $f^2$ and a similar spur-wheel $j'$, fixed to the side of the dial $h$ and gearing with $j$. By this means when the shaft $f^2$ is rotated the spur-wheel $j'$, with the dial $h$, is rotated upon the sleeve $b^3$ and exhibits at said windows, when the handle of the wheel $b$ is in its normal or resting position, the uppermost order or notification on the dial $h$, which will be the same as that which has been transmitted to the receiver D, and this can be seen from a distance by the operator or other person on the bridge or deck. At the opposite side of the transmitter there is another dial $k$, having similar orders on it to the others, and a pointer $k'$. This pointer is moved by the shaft $f^2$ through a spur-wheel $k^2$ on $f^2$ and a similar spur-wheel $k^3$, meshing with $k^2$, mounted on the spindle $k'^{\times}$ of the pointer $k'$. Thus when the apparatus is actuated and the shaft $f^2$ revolved the pointer $k'$ revolves with the other pointers referred to, and the position or order existing can be seen from this side of the instrument at a distance away from it, and, further, when the pointer $k'$ (which is a folding one having a hinge $k^4$) is extended, as shown, the position of the pointers and the orders which they are standing over will be readily ascertained from either side of the instrument by sight from a greater or less distance by the position of the pointer $k'$.

Regarding the receiving-instrument D, the example given in Fig. 1 is provided with duplex gongs, which for "ahead" orders give one tone or sound and for "astern" orders give another. This method of giving the differential sound indications being old, forms in itself no part of this invention; but under this invention, in connection with means for operating the pointer described, this duplex gong-actuating device is disposed and arranged in a special position relatively with the pointer and the transmitting-gearing—viz., the shafting $a$—that is, the strikers $l$ of the gongs $l'$ and their operating toothed wheels $l^2\ l^{2\times}$ are interposed between the pointer $c$ on the one hand and the pointer-actuating device ($d\ d^2$) on the other. By this means the sounding of a gong, giving one note or tone for "ahead" orders and the other giving another note or tone for "astern" orders, is rendered possible, so the gong-hammer-actuating wheels $l^2\ l^{2\times}$ are only moved the same amount of relative movement—viz., less than one complete revolution—in the apparatus being worked from one extreme to the other—i. e., the same amount as that of the pointer $c$.

As regards the actuation of the pointer of ship's telegraphic instruments, particularly the receiving-instrument, in the manner described—that is, by giving it its full movement, and employing for this purpose only a fraction of the movement of the shafting or means by which the communications are transmitted, and of making the movement sharp and certain, and after actuation holding it in the position to which it has been moved modifications of or equivalents of the device hereinbefore described and illustrated, by which this is effected, may be used without departing from this invention. Illustrations of such modifications or equivalents are shown in Figs. 9 and 10. In Fig. 9 the means consist of a "drunken" screw $o$ mounted on the shaft $a$, and a wheel $p$ with rollers $p'$ on it mounted on the pointer-shaft $c'$, such rollers fitting in spaces between the teeth $o'$ of $o$. This screw $o$, which is a well-known device in itself, has the parts of its threads which give motion to the wheel $p$ arranged at a suitable inclination of course to the axis of the shaft $a$, while the other parts of the teeth are disposed in a plane at right angles to the shaft $a$, so that when these parts of the teeth are revolving past one of the rollers $p'$ no movement is given to the wheel $p$. At the same time such wheel and the pointer $c$ are kept in the same central position, and cannot be moved. The modification shown in Fig. 10 consists of a wheel $r$, with teeth $r'$ on it, mounted on the shaft $a$, a disk $s$ on the pointer-shaft $c'$ with projecting studs $s'$ on its face, and a locking-pawl $t$. In this case at a point in a revolution of the wheel $r$ one of its teeth $r'$ comes in contact with the studs $s'$ of $s$ and moves the shaft $c'$ and pointer a distance from one order to another, the rest of its stroke having no action upon the disk $s$, this disk and the shaft $c'$ being held in position with the pointer central in its order after each actuation by the wedge-pawl $t$, which is mounted on a spring $t'$ fixed to the frame of the instrument. These modifications will suffice to show that the invention is not restricted as to the exact form or means of effecting the actions or manner of operation of the pointers of the receiving-instruments of ships' and like telegraphs under this invention.

The invention above described has been more particularly specified as applied to ship's telegraphic apparatus for communicating between the bridge or deck of a vessel and the engine-room. It is, however, to be stated that by simple suitable modifications as to dials it may be applied to other ship's telegraphic purposes, as "steering-telegraphs," "lookout-telegraphs," "turret-telegraphs," "stokehold-telegraphs," and analogous purposes; also, it is not restricted to the particular forms or constructions of parts, and the type of transmitter, receiver, and the transmission means set forth with reference to and shown in the drawings, as different types and forms thereof may be used or substituted for these. Furthermore, the improvements described and claimed hereunder may be applied separately, or two or more of them in conjunction, in telegraphic apparatus of the types or forms hereinabove referred to.

What is claimed in respect of the herein-described invention is—

1. A ship's hand-actuated mechanical telegraph, comprising an indicator, a hand-actuated transmitter and the operating connections between said hand-operated transmitter and the indicator comprising in combination an intermittent-motion-transmitting device connected with the indicator and a reducing-gear connected with the intermittent-motion device whereby during each continuous action of the hand-operating means the transmission means is moved a greater degree than the intermittent-motion device and said device in turn operates the indicator only at intervals, substantially as described.

2. The combination in a ship's telegraphic apparatus of a transmitting-instrument; a vertically-arranged actuating-wheel thereon adapted to be moved one revolution for each order or notification to be transmitted and having a single aperture therein; a vertically-disposed rotary dial with the telegraph orders or notifications thereon directly behind said wheel, one of which orders is adapted to show through the opening of said wheel when in its normal position of rest; gearing interposed between said wheel and said order-disk by which the disk is moved and the movement thereof is only a fraction of that of the wheel; a receiver having an indicator and a series of orders or notifications similar to those on the said transmitter-dial; motion-transmission means by which the said receiver-indicator is operated; and a mechanism on said transmission means at the receiver by which the movement of said indicator is reduced to a fraction only of that of the said transmission means; substantially as described.

3. The combination in a ship's telegraphic apparatus of a transmitting-instrument; a vertically-arranged actuating disk-wheel thereon having a window therein, and adapted to be moved one revolution for each order or notification to be transmitted; a vertically-disposed rotary dial with the telegraphic orders or notifications thereon directly behind said wheel, one of which orders is adapted to show through the said window of the actuating-wheel when in its normal position of rest; a stationary disk disposed between said actuating-wheel and the rotary or order dial having a window coincident with that of the actuating-wheel, when in the position of rest; gearing interposed between said wheel and said order-disk by which the disk is moved and the movement thereof is only a fraction of that of the wheel; a receiver having an indicator and a series of orders or notifications similar to those on the said transmitter-dial; motion-transmission means by which the said receiver-indicator is operated; and a mechanism on said transmission means at the receiver by which the movement of said indicator is reduced to a fraction only of that of the said transmission means; substantially as described.

4. In combination, the receiving-instrument, a vertically-arranged actuating-wheel, connections between the receiving-instrument and actuating-wheel, a horizontal dial, a pointer, a vertical dial and a pointer, a shaft $f^2$ connected with the actuating-wheel, a reducing-gear forming said connection, the beveled gears between the shaft and the horizontal pointer and the connection from the horizontal shaft to the vertical pointer, substantially as described.

5. In a ship's hand-actuated mechanical telegraph, the combination of a hand-actuated wheel, $b$, on the transmitter adapted to be revolved one revolution for each order or notification to be transmitted; shafting $a$ operated by said wheel; a receiver having an indicator-pointer, $c$, operated by said shafting; intermittent and fractional motion transferring mechanism at the receiver by which said pointer is intermittently operated and receives a fraction only of that of the shafting, the rest being non-operative thereon before and after each action; and gongs with double strikers actuated by said mechanism by which varying tones are produced, interposed between said mechanism and the pointer, whereby one or other of said strikers is only sounded once for each complete action or revolution of the wheel $b$; substantially as described.

6. In combination, the receiver, the actuating-wheel $b$, the dial and pointer $e'$ $e$ adjacent to the actuating-wheel, the shaft $b'$, carrying the wheel $b$, the transmitting connection from said shaft to the receiver including the disks $d$ $d^2$ for imparting a fractional part of the movement to the receiving-pointer and connections from the shaft $b'$ to the pointer $e$ including the disks $f f'$ adapted to impart to the pointer a fractional part of the movement of said shaft $b'$, substantially as described.

In testimony whereof I hereunto affix my signature in presence of two witnesses.

WILLIAM CHADBURN.

Witnesses:
A. W. CREEDBURN,
JAMES CARSE.